(12) United States Patent
Nicholson et al.

(10) Patent No.: US 10,969,080 B2
(45) Date of Patent: Apr. 6, 2021

(54) LIGHT EFFICIENCY METHODS FOR VEHICULAR HTL SYSTEMS

(71) Applicant: SMR Patent S.à.r.l., Luxembourg (LU)

(72) Inventors: James Nicholson, Lonsdale (AU); Shane Koehne, Lonsdale (AU); Scott Edwards, Lonsdale (AU); Simon Belcher, Lonsdale (AU); Jacob Messenger, Lonsdale (AU); Mathew Chapman-Winter, Lonsdale (AU); Gary Dekievit, Lonsdale (AU); Simon Field, Lonsdale (AU); Sam Thoday, Lonsdale (AU); Dean Caruso, Lonsdale (AU); Bill Frank, Lonsdale (AU); Raimund Negel, Stuttgart (DE); Arne Schmierer, Stuttgart (DE); Daniel Fritz, Stuttgart (DE); Andreas Herrmann, Stuttgart (DE); Eugen Meier, Ditzingen (DE); Oliver Schmidt, Stuttgart (DE); Volker Erhart, Stuttgart (DE); David Chamberlain, Portchester (GB); Andrew Brian Little, Portchester (GB); Eugene Schmirin, Lonsdale (AU); Drew Raymond Evans, Adelaide (AU); Colin James Hall, Adelaide (AU); Kamil Zuber, Jaworzno (PL)

(73) Assignee: SMR Patent S.à.r.l., Luxembourg (LU)

( * ) Notice: Subject to any disclaimer, the term of this patent is extended or adjusted under 35 U.S.C. 154(b) by 0 days.

(21) Appl. No.: 16/572,061

(22) Filed: Sep. 16, 2019

(65) Prior Publication Data
US 2020/0011502 A1    Jan. 9, 2020

Related U.S. Application Data

(63) Continuation-in-part of application No. 15/956,091, filed on Apr. 18, 2018, now Pat. No. 10,479,266, (Continued)

(30) Foreign Application Priority Data

Jan. 24, 2012  (AU) ............................... 2012900267
Feb. 24, 2015  (EP) ................................... 15156407

(51) Int. Cl.
*F21S 43/249*    (2018.01)
*F21S 43/33*    (2018.01)
(Continued)

(52) U.S. Cl.
CPC .......... *F21S 43/249* (2018.01); *B60Q 1/0011* (2013.01); *B60Q 1/0017* (2013.01);
(Continued)

(58) Field of Classification Search
USPC ....................................................... 362/494
See application file for complete search history.

(56) References Cited

U.S. PATENT DOCUMENTS 6,586,098 B1    7/2003  Coulter et al.
8,764,256 B2    7/2014  Foote et al.
(Continued)

OTHER PUBLICATIONS

Gargori et al., 2012, Iron and chromium doped perovskite ($CaMO_3$ M—Ti, Zr) ceramic pigments, effect of mineralizer, 38(6):4453-4460.
(Continued)

*Primary Examiner* — Evan P Dzierzynski
*Assistant Examiner* — Keith G. Delahoussaye
(74) *Attorney, Agent, or Firm* — Jones Day

(57) ABSTRACT

A multifunction lamp unit for a vehicle includes a housing, at least one light pipe together with at least one light source
(Continued)

disposed at least partially within the housing, and a clear lens substantially enclosing the housing, the at least one light pipe and the at least one light source, the lens having an inner surface, an outer surface disposed opposite the inner surface and at least one of a continuous transparent and translucent coating on the outer surface.

50 Claims, 6 Drawing Sheets

Related U.S. Application Data which is a continuation-in-part of application No. 15/589,043, filed on May 8, 2017, now Pat. No. 10,508,788, which is a continuation-in-part of application No. 15/052,120, filed on Feb. 24, 2016, now Pat. No. 9,643,532, and a continuation-in-part of application No. 15/439,188, filed on Feb. 22, 2017, now Pat. No. 10,703,281, which is a continuation-in-part of application No. 14/936,024, filed on Nov. 9, 2015, now Pat. No. 9,656,601, which is a continuation-in-part of application No. 14/374,376, filed as application No. PCT/AU2013/000047 on Jan. 24, 2013, now Pat. No. 9,181,616.

(51) Int. Cl.
| | |
|---|---|
| *F21S 43/14* | (2018.01) |
| *F21S 43/237* | (2018.01) |
| *F21S 43/245* | (2018.01) |
| *B60R 1/12* | (2006.01) |
| *B60Q 1/00* | (2006.01) |
| *C22C 27/06* | (2006.01) |
| *F21S 43/20* | (2018.01) |
| *B60R 11/04* | (2006.01) |
| *F21W 105/00* | (2018.01) |
| *F21W 103/25* | (2018.01) |
| *F21W 103/60* | (2018.01) |

(52) U.S. Cl.
CPC ............ *B60R 1/1207* (2013.01); *C22C 27/06* (2013.01); *F21S 43/14* (2018.01); *F21S 43/237* (2018.01); *F21S 43/245* (2018.01); *F21S 43/26* (2018.01); *F21S 43/33* (2018.01); *B60R 11/04* (2013.01); *B60R 2001/1253* (2013.01); *F21W 2103/25* (2018.01); *F21W 2103/60* (2018.01); *F21W 2105/00* (2018.01)

(56) References Cited

U.S. PATENT DOCUMENTS

| | | |
|---|---|---|
| 2004/0114262 A1 | 6/2004 | Boddy et al. |
| 2007/0053195 A1 | 3/2007 | Alberti |
| 2008/0212189 A1 | 9/2008 | Baur et al. |
| 2011/0273671 A1 | 11/2011 | Chu |
| 2013/0120130 A1 | 5/2013 | Cha |
| 2013/0194687 A1* | 8/2013 | Hall .................. G02B 1/04 359/884 |
| 2013/0242586 A1 | 9/2013 | Huizen et al. |
| 2014/0169017 A1* | 6/2014 | Song .................. F21S 43/26 362/511 |
| 2014/0320823 A1 | 10/2014 | Ammar et al. |
| 2017/0066386 A1 | 3/2017 | Sawada et al. |
| 2018/0265005 A1* | 9/2018 | Lettis .................. B60R 1/072 |

OTHER PUBLICATIONS

Ghosh et al., 2013, "HCP to omega martensitic phase transformation pathway in pure Zr", Journal of Alloys, Conference: Solid State Physics Symposium.

* cited by examiner

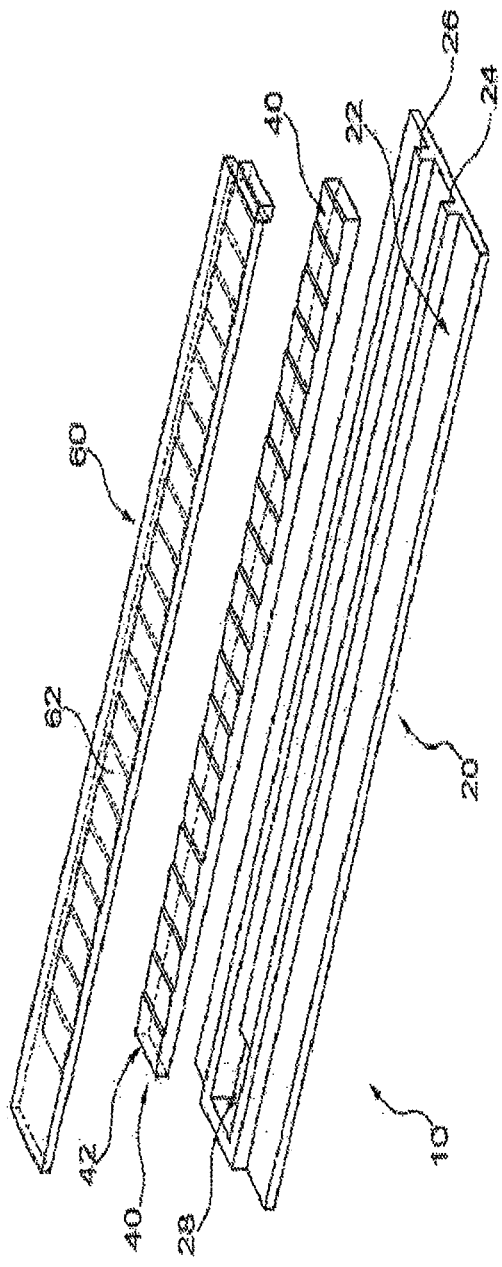
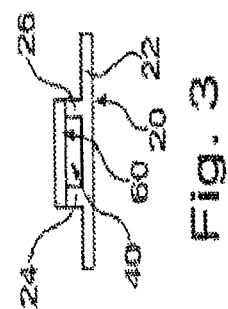
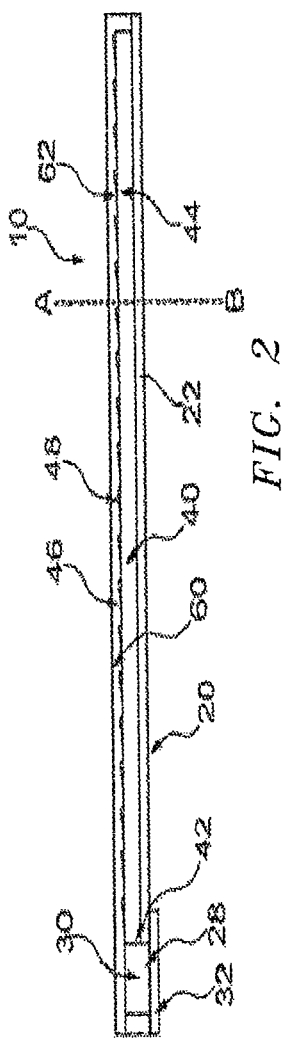
FIG. 1
FIG. 2
Fig. 3

LIGHT EFFICIENCY METHODS FOR VEHICULAR HTL SYSTEMS

CROSS-REFERENCE TO RELATED APPLICATIONS

This application is a continuation-in-part of U.S. patent application Ser. No. 15/956,091, filed Apr. 18, 2018, which is a continuation-in-part of U.S. patent application Ser. No. 15/589,043, filed May 8, 2017, which is a continuation-in-part of U.S. patent application Ser. No. 15/052,120, filed Feb. 24, 2016, which claims the benefit of foreign priority to European Patent Application No. 15156407.7, filed Feb. 24, 2015; and which also is a continuation-in-part of U.S. patent application Ser. No. 15/439,188, filed Feb. 22, 2017, which is a continuation-in-part of U.S. patent application Ser. No. 14/936,024, filed Nov. 9, 2015, which is a continuation-in-part of U.S. patent application Ser. No. 14/374,376, filed Jul. 24, 2014 and now issued as U.S. Pat. No. 9,181,616, which is a national stage entry of International Patent Application No. PCT/AU2013/000047, filed Jan. 24, 2013, which claims the benefit of foreign priority to Australian Patent Application No. 2012900267, filed Jan. 24, 2012, each of which is herein incorporated by reference in its entirety for all purposes.

BACKGROUND

1. Field

The present invention relates to a system that may be used for vehicular light components, such as for a vehicle design element, selected from vehicle emblems, badges, logos and the like and/or other vehicular light components, such as in rear view mirrors, which can provide a uniform light output without the use of light pipe optic features and without the light source being viewable. In particular, the description relates to light efficiency methods for such systems.

2. Description of Related Art

Vehicles, such as passenger cars, vans and trucks, include various interior and exterior vehicular lighting components capable of emitting light for various purposes. Additionally, such aforementioned vehicles often include various interior and exterior vehicular components having a metallic reflective coating coated thereon exhibiting a chrome or mirror-like surface finish. In such systems it is desirable that the overall number of visible lighting components is reduced. Metallic reflective coatings which provide such features are known from, for example, WO 2011/075796 and WO 2013/110122.

A lamp for vehicles, especially for side-view mirrors or other viewing means, is described in European Patent No. 1 657 488 B1. In this lamp, a weld seam or an adhesive seam inseparably connects a substantially U-shaped front housing part, which is configured as a transparent clear lens, to a back panel in order to provide a closed, watertight housing within which at least one light source is arranged. The housing components are described as made of hard plastics, preferably polymethyl methacrylate (PMMA) or plastics of this family. The back panel can also be made of another plastic, such as polycarbonate (PC), polybutylene terephthalate (PBT) or the like.

Another such lamp for vehicles is described in European Patent No. 1 852 306 B1, in which an light source, the outside, or the inside of a U-shaped front housing part features a lens system. The lens system is in the form of a surface texturing for the focusing, parallel direction, or scattering of the emitted light.

The construction of these known lamps is expensive. In addition, welding processes negatively affect the tolerances of adjacent clearances. The necessity of a weld seam or adhesive seam also limits the design of the lamps, as with a blinker in a side-view mirror arrangement of a vehicle.

German Patent Application No. 10 2011 103 200 A1 describes a light window for an illuminated unit in a side-view mirror where the light window fits the outer contour of the housing of the side-view mirror and seals an opening in the housing of the side-view mirror. The light window serves as a light pipe and features outcoupling structures on at least one area. The light window is produced out of an optical film which has a molded coating and is configured as a light pipe, where the optical film contains at least one outcoupling structure. A crystal-clear base material or, alternatively, a colored transparent material can be used for production and it can be produced in a single extrusion die. To produce the light window, the optical film is placed into the extrusion die so that a protective layer is injected on the die side of the film and the coating is injected on the core side of the film. The protective layer can be made of PC film and the coating can be made of PC or PMMA.

Molding a coating on a film to produce a light window, such as a blinker, is complicated particularly since a fastening on a housing is also needed.

A transparent and/or translucent coating may be used in such systems. The respective systems may have various issues with light efficiency as light is either lost from the system or reflected inside the system. The problems include that light pipes may have bright/dull spots that cannot be solved by shape changes due to restrictions such as customer styling, conversely the customer may desire variations in the illumination between parts of common shape. The illumination pattern is also largely set by the positioning of the light sources when using optics created out of materials with single material. Finally as the diffusion/light emission of the light pipe or similar is generally somewhat constant a large amount of light is wasted and must be masked in areas where no illumination is desired, such as near light sources.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, a method for manufacturing a lamp for vehicles overcomes the disadvantages of the state of the art. For example, a lamp should be easy to manufacture and offer large freedom of design with high light yield.

In an aspect, a multifunction lamp unit for a vehicle includes a housing, at least one light pipe together with at least one light source disposed at least partially within the housing, wherein the at least one light sources is configured to emit light based on at least receiving electrical power from an electrical power source, wherein the at least one light source being arranged adjacent to and directed towards the at least one light pipe, and a clear lens substantially enclosing the housing, the at least one light pipe and the at least one light source, the lens having an inner surface, an outer surface disposed opposite the inner surface and a continuous transparent and/or translucent coating on the outer surface, wherein when the at least one light source emits light, the continuous transparent and/or translucent coating is at least partially permeable to at least some light which is emitted by the at least one light source and passed through the lens, wherein the at least one light pipe is provided with an inside coating and/or an outside coating and/or faded marks.

If present, the coating may be located on selective locations of the at least one light pipe, optionally in different thicknesses.

The coating may be a hardcoating selected from the group of an organo-silicon, an acrylic, a urethane, melamine and a $SiO_xC_yH_z$.

The coating may have a different refractive index compared to the refractive index of the material of the light pipe.

The faded marks may be selected from the group consisting of etches, tints, dying, additives, reflecting materials, scattering materials or optics moulded into the light pipe.

The faded marks may be introduced into the at least one light pipe by choosing at least one additive for the respective plastic.

If two or more light sources are present, the two or more light sources may be attached to a central light engine.

If two or more light pipes are present, the two or more light pipes may be located in close vicinity to the two or more light sources attached to the central light engine.

One or more of the two or more light pipes may be coated at selective locations.

The unit may be produced out of plastic in a 3-component injection procedure, wherein the refractive index of the plastic of the clear lens is selected to be different from the refractive index of the plastic of the light pipe, the boundary between the clear lens and the at least one light pipe adjacent to it is at least partly formed with a structure.

The multifunctional lamp may comprise at least one light foil.

The light foil may be arranged at least partly between the clear lens and at least a part of the at least one light pipe.

The housing may be formed with a first recess to build an installation space for at least one light source, wherein the first recess is sealed.

The housing may be formed with a second recess to build an installation space for a control unit, wherein the second recess is sealed.

The control unit may be connected to at least one of the at least one light source, the light foil and the vehicle.

The light foil may extend along at least a part of the clear lens.

At least one light coupling area may be provided at a first end of a first light pipe facing the installation space or a first end of a second light pipe extending along a region of the light foil.

Each light pipe may be enclosed by the housing and the clear lens.

The light rays from a first light source may be subjected to a total internal reflection at the boundary between the first light pipe and the clear lens outside at least one light decoupling area.

The light rays from a second light source may be decoupled along at least a part of the extent of the second light pipe.

The light rays decoupled from the second light pipe may pass at least one of the light foil, the clear lens, and the housing.

The light rays decoupled from the second light pipe may pass an opening in at least one of the light foil and the housing.

The light rays from a third light source are coupled at a first end of a third light pipe and decoupled at the second end of the third light pipe.

There may be a plurality of light decoupling regions provided by at least one of the clear lens and the housing.

There may be a plurality of at least one of light decoupling directions and light decoupling ranges.

There may be a plurality of light decoupling regions, with light having different characteristics being decoupled from the different decoupling regions.

The clear lens may be made out of a polymeric substrate, where the polymeric substrate is coated with a chromium-based reflective coating, and the polymeric substrate and the chromium-based reflective coating are at least in part permeable to light originating from at least one of the light foil and the at least one light source.

The reflective coating may be an alloy of chromium and a dopant material, the dopant material being selected from the hexagonally close-packed transition metals, the alloy having a crystal structure of a primary body-centered cubic phase in coexistence with a secondary omega hexagonally close-packed phase.

The alloy may be a binary alloy of chromium and the dopant material.

The atomic percentage of the dopant material in the binary alloy may range from about 1.9 at. % to about 5.8 at. %.

The dopant material may be selected from hexagonally close-packed transition metals zirconium, titanium, cobalt, hafnium, rubidium, yttrium and osmium.

The dopant material may be selected from hexagonally close-packed transition metals zirconium, titanium and cobalt.

The alloy may be a binary alloy and the dopant material is zirconium where the atomic percentage of the zirconium in the binary alloy is in the range of from about 4.5 at. % to about 5.8 at. %.

The alloy may be a binary alloy and the dopant material may be titanium, and where the atomic percentage of the titanium in the binary alloy is in the range of from about 1.9 at. % to about 5.8 at. %.

The alloy may be a binary alloy and the dopant material may be cobalt, where the atomic percentage of the cobalt in the binary alloy may be in the range of from about 1.9 at. % to 5.7 at. %.

The coating may have a thickness of 200 nm, 100 nm, be in the range of from 40 nm to 80 nm, be in the range of from 50 nm to 70 nm, or be about 60 nm.

The polymeric substrate may be formed from a material selected from the group of polyacrylate, polyester, polystyrene, polyethylene, polypropylene, polyamides, polyamides, polycarbonate, epoxy, phenolic, acrylonitrile-butadiene-styrene, acrylonitrile-styrene-acrylates, acetal and blends of these.

The polymeric substrate may be formed from a material selected from the group of polycarbonate, poly(2,2'-dihydroxyphenylpropane) carbonate, polydiethyleneglycol bis (allyl carbonate), polymethylmethacrylate and polystyrene, or blends thereof.

The polymeric substrate may include a pre-coated film in the form of either a hardcoat, an inorganic oxide, or a thin metal film, or a combination of such pre-coated films.

Two or more light pipes may be present at the same location, wherein at least one light pipe can be seen from the outside and wherein one or more of the other light pipes are coated with a chromium-based reflective coating.

The transparent and/or translucent coating may be behind where the two or more light pipes meet.

A rear view device of a vehicle may include the multifunction lamp unit.

The light source and the light foil may fulfill different light functions.

At least two light sources may fulfill different light functions.

The rear view device may further include a head moveable relative to the vehicle, with the head including at least one casing part providing at least one opening for the multifunction lamp unit.

The clear lens may extend along the casing part.

The clear lens may be connected at least to the casing part.

The casing part may be provided by a bezel.

The rear view device may include at least one of a camera and a reflective element.

The camera may be arranged within the head.

The rear view device may further include at least one light decoupling region providing at least one of a turn light indicator, a blind spot indicator, a puddle light, a logo light and an approach light.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

FIG. 1 is a diagram illustrating a housing, a light pipe and a clear lens of a lamp produced according to an embodiment.

FIG. 2 is a diagram illustrating the light from FIG. 1 as a unit in longitudinal section.

FIG. 3 is a diagram illustrating a cross-sectional view along the line A-B in FIG. 2.

Figure 4:
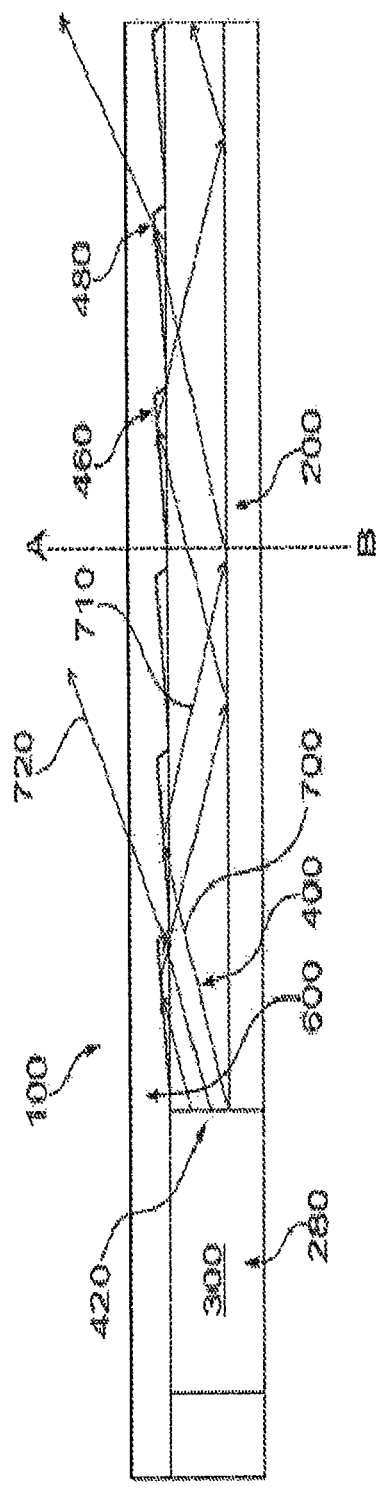
FIG. 4 is a diagram illustrating a part of an alternative lamp in longitudinal section.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The term "rearview" is here defined as a view of the surrounding area, which is not in the field of view of the driver, i.e. the directions opposing, left, right, below and above of the viewing direction, but can also comprise the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

The term "entity" relates here to any living or non-living entity, material and/or machine, which can gather the signals with which the vehicle is conveying information and/or induces some kind of action based on this signals. This can comprise for example a device, for example a mechanical, electromechanical, electronic, electromagnetic, optical, chemical or biological device and/or any combination thereof, for example a computer, a robot, an artificial intelligence, but also an animal and/or a plant.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

In one aspect the invention is directed to a multifunction lamp unit for a vehicle comprising a housing, at least one light pipe together with at least one light source disposed at least partially within the housing, wherein the at least one light sources is configured to emit light based on at least receiving electrical power from an electrical power source, wherein the at least one light source being arranged adjacent to and directed towards the at least one light pipe, and a clear lens substantially enclosing the housing, the at least one light pipe and the at least one light source, the lens having an inner surface, an outer surface disposed opposite the inner surface and a continuous transparent and/or translucent coating on the outer surface, wherein when the at least one light source emits light, the continuous transparent and/or translucent coating is at least partially permeable to at least some light which is emitted by the at least one light source and passed through the lens, wherein the at least one light pipe is provided with an inside coating and/or an outside coating and/or faded marks.

This design of the lamp unit allows for an improved control of light efficiency within the at least one light pipe, i.e. substantially no light is lost from the system.

It is proposed that the at least one light pipe is substantially transparent and without any visible discrete optic features in an un-lit state, while being diffusive in a lit state. But the light pipe annulus can also be substantially transparent and non-diffusive in both a lit and un-lit state, while the circumferential flanges or cylinders are substantially transparent in an un-lit state, while being diffusive in a lit state.

The at least one light pipe may comprises a clear polymeric material. The clear polymeric material may be selected from the group consisting of polyacrylate, such as poly(methyl methacrylate) (PMMA), polyester, polystyrene, polyethylene, polypropylene, polyamides, polyamides, polycarbonate, epoxy, phenolic, acrylonitrile-butadiene-styrene, acrylonitrile-styrene-acrylates, acetal and blends of these. Preferred substrate materials include polycarbonate, poly(2,2'-dihydroxyphenylpropane) carbonate, polydiethyleneglycol bis(allylcarbonate), polymethylmethacrylate and polystyrene, or blends thereof. In one embodiment the at least one light pipe is made from PMMA. Here, the term "light pipe" can be used to refer to a tubular structure that is adapted to transport light. Light might be coupled into the light pipe at one, or at both ends of the at least one light pipe. The light is then being radiated from the at least one light pipe along its length, or at least along part of its length.

The coating that may be located on the inside and/or outside of the at least one light pipe may be located on selective locations of the light pipe, optionally in different thicknesses. The selective locations are selected depending on the position at which light should be contained within the light pipe or should be emitted to the outside. In one embodiment the entire at least one light pipe is coated.

The coating may be a hardcoating selected from the group of an organo-silicon, an acrylic, a urethane, melamine and a $SiO_xC_yH_z$.

The hardcoating may evenly diffuse the light output. This may provide an easier way to turn normal clear pieces into light pipes by adding a coating rather than any built-in particles. As the amount of scattering/illumination would be determined by the hardcoating, it could be selectively applied and/or applied in different thicknesses to change the pattern of the light emitted.

The hardcoating may have a thickness that can provide the desired property and that can be determined by the skilled person.

The hardcoating may be selected from triethoxysilane, methyltrimethoxyethoxysilane, methyltriacetoxysilane, methyltripropoxysilane, methyltributoxysilane, ethyltrimethoxysilane, ethyltriethoxysilane, vinyltrimethoxysilane, vinyltriethoxysilane, vinyltracetoxysilane, vinyltrimethoxyethoxysilane, phenyltrimethoxysilane, phenyltriethoxysilane, phenyltriacetoxysilane, gamma-chloropropyltrimethoxysilane, gamma-chloropropyltriethoxysilane, gamma-chloropropyltripropoxysilane, 3,3,3-trifluoropropyltrimethoxysilane gamma-glycidoxypropyltrimethoxysilane, gamma-glycidoxypropyltriethoxysilane, gamma-(beta-glycidoxyethoxy)propyltrimethoxysilane, beta-(3,4-epoxycyclohexyl)ethyltrimethoxysilane, beta-(3,4-epoxycyclohexyl)ethyltriethoxysilane, gamma-methacryloxypropyltrimethyoxysilane, gamma-aminopropyltrimethoxysilane, gamma-aminopropyltriethoxysilane, gamma-meraptopropyltrimethoxysilane, gamma-mercaptopropyltriethoxysilane, N-beta(aminoethyl)-gammaaminopropyltrimethoxysilane, beta-cyanoethyltriethoxysilane and the like; dimethyldimethoxysilane, phenylmethyldimethoxysilane, dimethyldiethoxysilane, phenylmethyldiethoxysilane, gamma-glycidoxypropylmethyldimethoxysilane, gamma-glycidoxypropyl methyldiethoxysilane, gamma-glycidoxypropyl phenyldimethoxysilane, gamma-glycidoxypropyl phenyldiethoxysilane, gamma-chloropropylmethyldimethoxysilane, gamma-chloropropylmethyldiethoxysilane, dimethyldiacetoxysilane, gamma-methacryloxypropyl methyldimethoxysilane, gamma-metacryloxypropylmethyldiethoxysilane, gamma-mercaptopropyl methyldimethoxysilane, gamma-mercaptopropylmethyldiethoxysilane, gamma-aminopropylmethyldimethoxysilane, gamma-aminopropylmethyldiethoxysilane, methylvinyldimethoxysilane, methylvinyldiethoxysilane and the like.

The coating may have a different refractive index compared to the refractive index of the material of the light pipe. This could either be for the purposes of restricting light loss by increasing internal reflections or increase the amount of light escaping by reducing the internal reflection angle. For example, the coating may have a lower refractive index than the material of the at least one light pipe.

In addition to or alternatively to the coating described above, faded marks may be provided on the inside of the at least one light pipe. Such faded marks may be selected from the group consisting of etches, tints, dyings, additives, reflecting materials, scattering materials or optics moulded into the at least one light pipe. For example, the faded marks may be introduced into the at least one light pipe by choosing at least one additive for the respective plastic.

The multifunctional lamp may also comprise at least one light source attached to a central light engine. The use of a central light engine that contains all the light sources emitting into a plurality of different light pipes avoids the problem of positioning the light source inside the lit device. The central light engine could also avoid issues when different light system/engine(s) would be used for multiple devices. Redundant costs to distribute and interpret the control of these devices with systems may be avoided by the use of a central light engine. It may be possible to use the same light pipe that has a diffusing end, near the illumination output, and a non-emitting start, near the light source when a coating or a selective coating as described herein is used.

The at least one light source may be any suitable light source applicable for the intended purpose. In one embodiment of the invention, the at least one light source comprises at least two LED lamps to illuminate the two or more light pipes. The at least two or more light sources may be arranged adjacent to and directed towards the two or more light pipes. The light is then radiated away from the light source along the length of the light pipe.

The central light engine may have two or more light sources, such as two, three, four or more light sources. The light sources may be the same or may be different in color and/or functionality and/or intensity.

In such an embodiment with two or more light sources, two or more light pipes may be present, wherein the two or more light pipes may be used in close vicinity to the two or more light sources attached to the central light engine. In this embodiment, one or more of the two or more light pipes may be coated at specific locations.

The multifunctional lamp according to the invention is a lamp in which the interior of the system, for example the light source, light guide etc., which is switchable between an on state and an off state, is hidden until illumination is turned on so that the light produced in the inside the system can be seen from outside ("Hidden Till Lit" (HTL)). Thus, for example, any logo or emblem which was hidden will be visible only then.

The HTL feature of the system is provided by a transparent and/or translucent coating applied to the lens, either on the outside or the inside. Preferably the coating is provided on the outside of the lens. Such transparent and/or translucent coating is a coating that has a certain reflectivity so that, for example, the light source or light pipe cannot be seen from one side but that has also a certain degree of translucence so that the light from the light source and/or the light pipe can be seen once lit.

In embodiments of the present invention, the front surface of the lens is a polished, textured or machined surface. When the transparent and/or translucent coating is deposited on a polished, textured or machined substrate surface it provides a visible surface that is either a highly polished metal looking surface or a textured metal surface that replicates metal finishing, for example brushed stainless steel.

The lens may be made out of clear and/or translucent polymeric material. The polymeric material may be formed from a material selected from the group of polyacrylate, polyester, polystyrene, polyethylene, polypropylene, polyamides, polyamides, polycarbonate, epoxy, phenolic, acrylonitrile-butadiene-styrene, acrylonitrile-styrene-acrylates, acetal and blends of these, but is not limited thereto. For example, the polymeric substrate may be formed from a material selected from the group of polycarbonate, poly(2, 2'-dihydroxyphenylpropane) carbonate, polydiethyleneglycol bis(allyl carbonate), polymethylmethacrylate and polystyrene, or blends thereof.

The invention also proposes that the lens has an outer component, preferably made from a clear material mentioned above, and an inner component, preferably over moulded on the inner surface of the outer component and/or made from opaque material. The lens inner component material optic properties can be selected to additionally increase or decrease the reflected light back into the light pipe. A highly reflective material will increase the final light output level, a non-reflective material will reduce the overall final light output level.

The lens may be formed by any process known in the art, such as, for example, injection molding and/or thermoforming, but is not limited thereto.

The lens may include a pre-coated film in the form of either a hardcoat, a silicon hardcoat, an inorganic oxide, or a thin metal film, or a combination of such pre-coated films.

The transparent and/or translucent coating may be any coating that provides the desired functionality. For example, the transparent and/or translucent coating may be a transparent or translucent metal layer formed from a metal, alloy or conductive metalloid selected from the group consisting of chromium, aluminum, titanium, nickel, molybdenum, zirconium, tungsten, niobium, tantalum, cobalt, manganese, silver, zinc, silicon, and mixtures thereof; an oxide, nitride, boride and/or carbide thereof and mixtures thereof, and/or alloys of any of the aforementioned metals, steel, stainless steel, silicon. In one embodiment, the transparent and/or translucent coating is a chromium-based reflective coating, and both the polymeric substrate and the chromium-based reflective coating are at least in part permeable to light originating from the at least one light pipe.

For example, the transparent and/or translucent coating may be an alloy of chromium and a dopant material, the dopant material being selected from the hexagonally close-packed transition metals, the alloy having a crystal structure of a primary body-centered cubic phase in coexistence with a secondary omega hexagonally close-packed phase. The alloy may be a binary alloy of chromium and the dopant material.

The atomic percentage of the dopant material in the binary alloy may range from about 1.9 at. % to about 5.8 at. %. The dopant material may be selected from hexagonally close-packed transition metals zirconium, titanium, cobalt, hafnium, rubidium, yttrium and osmium. In one embodiment the dopant material may be selected from hexagonally close-packed transition metals zirconium, titanium and cobalt. For example, the alloy may be a binary alloy and the dopant material is zirconium where the atomic percentage of the zirconium in the binary alloy is in the range of from about 4.5 at. % to about 5.8 at. %. In a further embodiment, the alloy may be a binary alloy and the dopant material may be titanium, and where the atomic percentage of the titanium in the binary alloy is in the range of from about 1.9 at. % to about 5.8 at. %. In a still further embodiment, the alloy may be a binary alloy and the dopant material may be cobalt, where the atomic percentage of the cobalt in the binary alloy may be in the range of from about 1.9 at. % to 5.7 at. %.

The coating may have a thickness of 200 nm, 100 nm, be in the range of from 40 nm to 80 nm, be in the range of from 50 nm to 70 nm, or be about 60 nm.

The coating may have a minimum light transmission of 5% to a maximum of 100%. In some embodiments, the light transmission of the coating is from 5% to 20%. The light transmission of the transparent and/or translucent coating may be 5%, 6%, 7%, 8%, 9%, 10%, 11%, 12%, 13%, 14%, 15%, 16%, 17%, 18%, 19% or 20%. In specific embodiments, the light transmission of the transparent and/or translucent coating is about 8%. The transmission may depend on the coating used and thus can be adjusted.

The transparent and/or translucent coating may be part of a multilayer transparent and/or translucent stack on the front surface of the lens. The multilayer stack may comprise other layers such as hard coat layers, and the like. For example, a hard coat can be applied to the lens either on top of the transparent and/or translucent coating or between the lens and the transparent and/or translucent coating. The hard coat may be formed from one or more abrasion resistant layers. As is known in the art, a primer layer may be used between the hard coat and the lens or the transparent and/or translucent coating to enhance adhesion of the hard coat. The hard coat can be formed from one or more of a range of materials known for this purpose in the art, including an organosilicon, an acrylic, a urethane, a melamine or an amorphous organosilicon (SiOxCyHz). Organosilicon hard coats are particularly suitable and suitable materials include Silicone Hard Coat SHC 5020 from Momentive and GE587B from MomentiveGE Bayer. The hard coating material may be applied in a solvent, such as an alcohol solvent. The hard coat can be applied using any of the coating techniques known in the art, including flow coating, dip coating, spray coating, spin coating, etc. and then cured using techniques known in the art, such as heating to a temperature of about 100° C. to about 200° C. for the appropriate required period of time. Intermediate layers may be deposited between the respective layers of the multilayer stack. The intermediate layers may assist in adhesion between the respective layers and minimize or prevent delamination. The intermediate layers will generally be translucent and may be formed from silica.

The transparent and/or translucent coating can be deposited using any suitable elemental deposition technique, including Physical Vapour Deposition (PVD), Chemical Vapour Deposition (CVD), or the like.

The at least one light source may be any source that can be used to provide the required amount of light, either light of one color or lights of different color. For example, at least one light source may be used, wherein two or more light sources may also be encompassed by the present invention. For example, if two or more light sources are used, each light source may provide light in a different color or in a different brightness.

The at least one light source may be any suitable light source applicable for the intended purpose. In one embodiment of the invention, the at least one light pipe comprises at least one LED lamp to illuminate the light pipe. Here, the at least one LED lamp could be arranged at one end of the at least one light pipe, to radiate light into the at least one light pipe. The light is then radiated away from the at least one light source along the length of the at least one light pipe. Preferably, two or more LED lamps are employed, where at each end of the at least one light pipe one LED lamp is located.

The at least one light source may comprises one or more LED's, one or more OLED's, a similar display technology, a surface lit plastic sheet, such as Acrylite® (Evonik Industries), or any combination thereof. The at least one light source may be attached to a printed circuit board (PCB). The printed circuit board can include additional light sources, optionally positioned adjacent to light receiving surfaces to direct light into the light pipe. Generally, the at least one light source is hidden and cannot be seen from the outside. The at least one light source may be electrically-connected to the vehicle and is configured to emit light based on at least receiving electrical power from the vehicle, such as from an electrical power source (e.g. vehicle electrical system, battery, etc.) on the vehicle. As non-limiting examples, the at least one light source may be electrically-connected to the vehicle by way of one or more wiring harnesses or other suitable electrical connectors as may be understood by the skilled person.

Also provided herein is a multifunctional lamp unit, wherein two or more light pipes may be present at the same location, wherein at least one light pipe can be seen from the outside and wherein one or more of the other light pipes are coated with a chromium-based reflective coating. For example, the chromium-based reflective coating is behind where the two or more light pipes meet.

This arrangement may avoid problems relating to poor efficiency of a transparent and/or translucent coating to maintain an inability for the user to observe the light source (i.e. for it to be hidden). To have two distinct light paths, that is one that can be seen when viewed from external to the part that can only see a coated colored area (i.e. the coating is behind where the two paths meet) and another path that allows the light emission to not have to pass through the poor efficiency coating may help to eliminate such problems.

As illustrated in FIG. 1, a lamp 10 includes a housing 20, a light pipe 40 and a clear lens 60. Although not illustrated, a light foil may be arranged within the lamp 10 in accordance with the description of this application. Details related to the light foil are provided at least in reference to FIGS. 6-13 and their accompanying description. These three components are manufactured in an injection molding process. For example, the light pipe 40 can be produced out of PC in a first phase, the clear lens 40 out of crystal-clear or tinted PMMA in a second phase, and the housing 20 out of ABS (acrylonitrile-butadiene-styrene) in a third phase. As a result, one unit is formed, for example, as illustrated in FIGS. 2 and 3 in longitudinal section and cross-section, respectively.

Still referring to FIGS. 1-3, the housing 20 is formed with a back panel 22 and two webs 24 and 26 to receive the light pipe 40 between the webs 24 and 26 on the back panel 22. In addition, a recess 28 which builds an installation space 30 for a light source, which is not illustrated, is provided in the housing 20. The light source can include an LED on a printed circuit board, and the installation space 30 together with all plug boxes can be sealed by a lid 32.

The light pipe 40 features one end having at least one light incoupling area 42 adjacent to the installation space 30. Its surface, which borders the lower surface of the clear lens 60, can be provided with a lens system 44 which provides the total reflection areas 46 and outcoupling area 48 for the light that enters the light pipe 40 at each incoupling area 42. Because the clear lens 60 is formed with a corresponding lens system 62 on its surface opposite the lens system 44 of the light pipe 40, and also because the refractive indexes of the plastics of the clear lens 60 and of the light pipe 40 differ, total internal reflection at the outcoupling areas 48 is excluded.

The optical path within a lamp produced according an example of the invention will be explained in more detail below in reference to FIGS. 4 and 5. The illustrated lamp 100 differs from the lamp 10 due to a different geometry for the light pipe, whereas the light pipe 40 of the lamp 10 has a rectangular shaped cross section.

Figure 5:
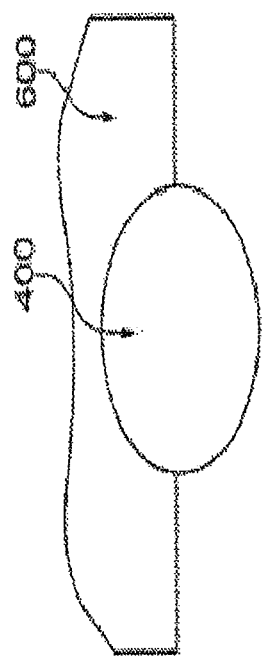
FIG. 5 is a diagram illustrating a cross-sectional view along the line A-B in FIG. 4.

To be enclosed between the back panel 22, the webs 24 and 26 of the housing 20, and the clear lens 60, the light pipe 400 of the lamp 100 has a circular cross section, as illustrated in FIG. 5.

In addition, the shape of the housing 200 and the clear lens 600 of the lamp 100 of FIGS. 4 and 5 is also adapted to have this circular shape.

The housing 200 is again configured into an installation space 300 for a light source by means of a recess 230.

The light pipe 400 in turn features incoupling areas of total internal reflection areas 420 for light rays from the light source, these light rays propagating in the form of the light rays 700 in the light pipe 400 in order to be deflected into the total reflecting light rays 710 at the total internal reflection areas 420 and into the light rays 720 leaving the lamp 100 at the outcoupling areas 480.

The shape of the clear lens 600 is adapted not only to the shape of the light pipe 400, but can also satisfy any design requirements on the lamp 100. For example, the surface can feature a wave form as illustrated in FIG. 5.

Figure 6:
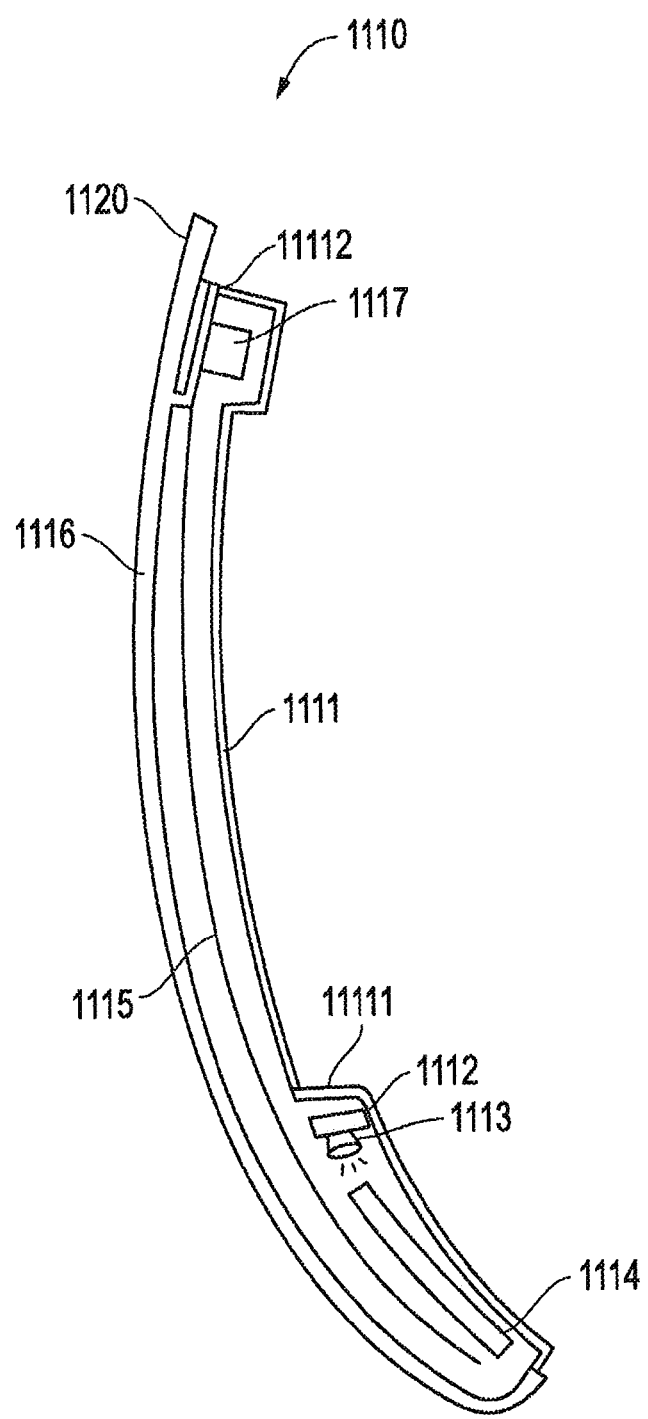
FIGS. 6 and 7 show cross sections of different embodiments of a multifunction lamp unit according to the invention making usage of a light foil.

FIG. 6 shows a lamp unit 1110. The lamp unit 1110 is a provided as single module which can be easily installed in a rear view device of a vehicle. Such a rear view device can comprise at least one reflective element and/or camera. The outer surface of the module is adapted to the contour of the rear view device into which it is to be installed. Further details on such an adaption are, in particular, described in U.S. Pat. No. 8,950,914 B2 (RVP-10-033US) which is incorporated by reference.

The lamp unit 1110 comprises a housing 1111 with a first recess 11111 for housing a first light source or light source with a printed circuit board 1112 carrying an LED 1113. Light emitted from the first light source is coupled into a first light pipe 1114, with the respective light being decoupled from the first light pipe 1114 at one end of the lamp unit 1110.

The lamp unit 1110 further comprises a second light source in form of a light foil 1115. Such light foils are known in form of for example light tapes of the company Light Tape Limited or in form of a printed lighting as distributed by the company Center of Process Innovation Limited. Making usage of such a light foil 1115 reduced the overall weight of the lamp unit 1110 and enables the production of small modules. Still further, the use of light foils allows in-process integration as it can be inserted into a mold and over-mold.

The light foil 1115 extends along a light window 1116 which is provided as a lid for the housing 1111. The connection between the light window 1116 and the housing 1111 is suited to provide a sealed module which is beneficial when used in an external rear view device.

Still further, the light foil 1115 is connected with a control unit 1117 arranged within a second recess 11112 of the housing 1111. The control unit 1117 can also be connected to the printed circuit board 1112 and a control device within the vehicle to which the rear view device with the lamp unit 1110 is attached.

As depicted in FIG. 6, the light foil 1115 extends from one end of the lamp unit 1110 to the other end thereof and, thus, overlaps the first light source 1112, 1113 and the first light pipe 1114. The light foil 1115 runs parallel to the interior surface of the light window 1116.

The light window 1116 is acting as a clear lens and is connected to a casing part 1120 of the rear view device as described in U.S. Pat. No. 8,950,914 B2 (RVP-10-033US). From the outside of the lamp unit 1110 of FIG. 6 a viewer can only see the light foil 1115 through the light window 1116, whereas the first light source 1112, 1113 and the first light pipe 1114 are hidden. In order to also hide the light foil 1115 as long as it is not lit, the light window 1116 can be coated with a chromium-based reflective coating which is translucent. In fact it is preferred to produce the light window 1116 from a polymeric substrate coated with a chromium-based reflective coating as described in US 2016/0059773, the disclosure of which is incorporated by reference.

Figure 8:
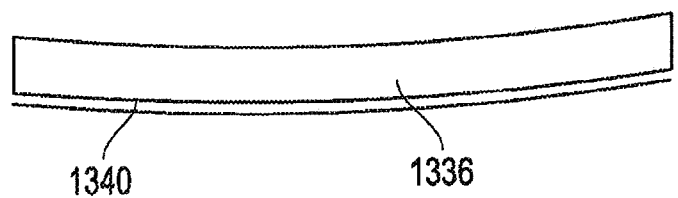
FIG. 8 depicts a cross section of a clear lens with a chromium-based coating.

FIG. 8 depicts a polymeric substrate in form of a clear lens 1336 or rather light window provided with a coating 1340. The coating 1340 is at least in part permeable to light originating for example from a light foil placed behind the clear lens 1336.

Thus, it is possible to hide both light sources shown in FIG. 6, i.e. the printed circuit board 1112, the LED 1113 and the light foil 1115, and the light pipe 1114 by making usage of the lens 1336 together with the coating 1340 instead of the light window 1116. The light unit 1110 can be integrated into a casing with a metallic coating such that the whole surface will have an appealing metallic look. As soon as the light foil 1115 is lit, respective light rays will pass not only through the lens 1336 but also a chromium-based coating 1340 thereon. But the first light source 1112, 1113 and the first light pipe 1114 will remain hidden.

Figure 9:
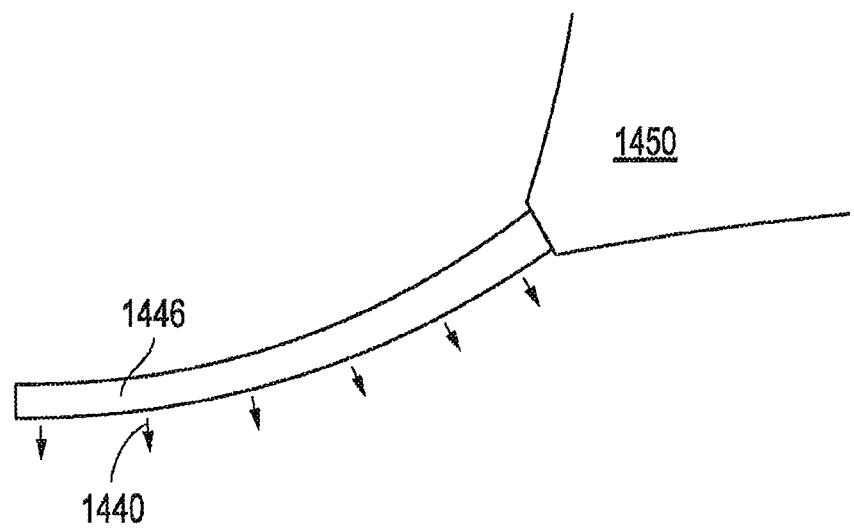
FIGS. 9 to 13 each show a cross section of multifunction lamp units of the invention together with the decoupled light rays and/or light cones.

FIG. 9 illustrates the light rays 1440 emitted from a light foil within a lamp unit 1446 as well as a light cone 1450 decoupled from a light pipe of a first light source into which light from an LED is coupled in line with the embodiment of FIG. 6. Different functions can be fulfilled by said light rays 1440 and said light cone 1450.

Figure 7:
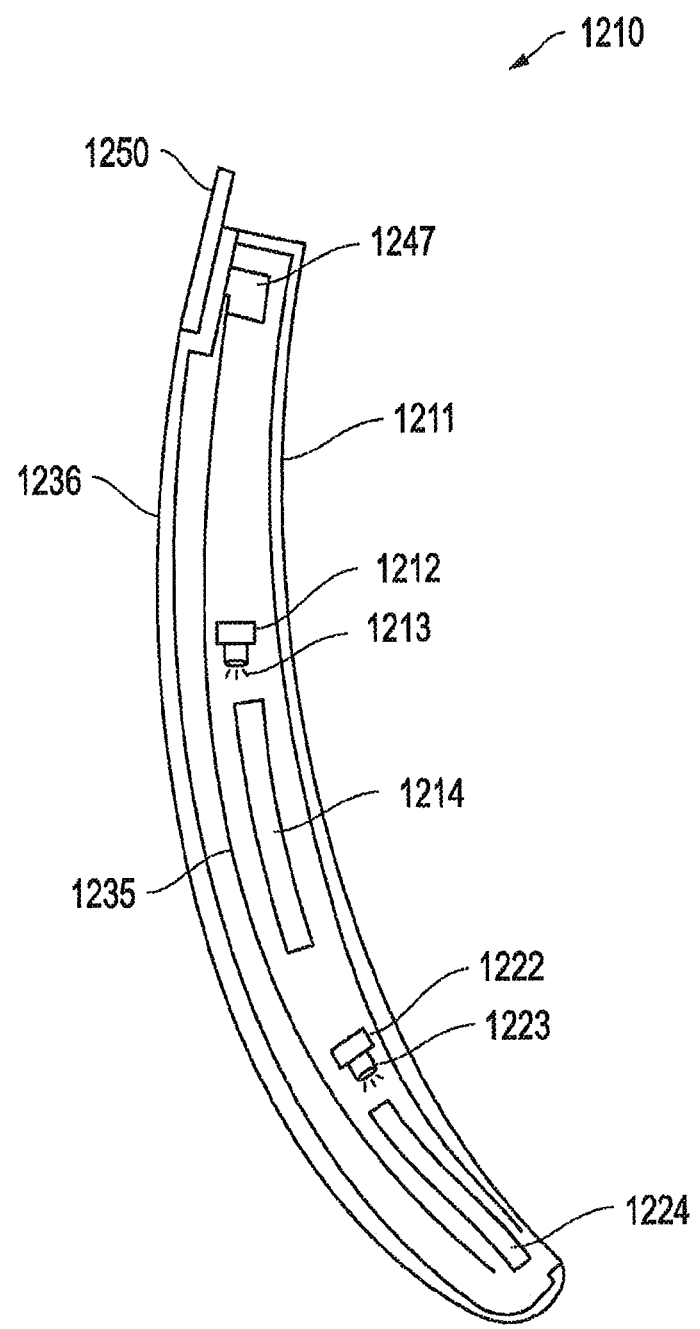

For example the lamp unit 1446 can be a turn signal indicator module of a rear view device of a vehicle, in particular an exterior mirror, such that the light cone 1450 has to fulfill the ECE (Economic Commission for Europe) regulations ensuring that a region beginning from 5° from the longitudinal axis of the vehicle, up to 60° to the longitudinal axis of the vehicle in the opposite direction of movement is light up. The light rays 1440 could provide a decorative effect or additional warning effect. FIG. 7 shows an alternative embodiment of a multifunctional lamp unit 1210 of the invention which, in contrast to the lamp unit 1110 of FIG. 6, has three light sources. In fact, the lamp unit 1210 makes usage not only of a first printed circuit board 1222 and a first LED 1223 for coupling light into a first conductor 1224 and a light foil 1235, but in addition uses a second printed circuit board 1212 and a second LED 1213 for coupling light into a second conductor 1214. The light foil 1235 extends again along a lens 1336 and overlaps both of the other two light sources 1212, 1213 and 1222 and 1223 as well as the respective light pipes 1214, 1224. The lens 1336 is coated with the translucent chromium-based coat, but does not have to be coated.

Figure 10:
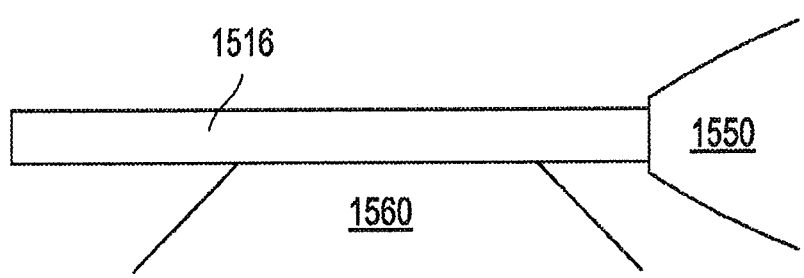

Thus, in addition to the first light source 1222, 1223 and the second light source 1235, their lamp unit 1250 comprises the third light source 1212, 1213. FIG. 10 illustrates light cones decoupled from the first and third light sources.

A multifunction lamp unit 1516 of FIG. 10 emits light rays along its lens analogous to the lamp unit 1446 of FIG. 9, without the respective light rays being shown in FIG. 10. FIG. 10 rather serves to explains light decoupled from two light pipes as the two light pipes 1214 and 1224 of FIG. 7. In fact, the first light pipe 1224 guides all light to one end of the lamp unit 1516 such that there is a light cone 1550, whereas the second light pipe 1214 decouples light along its extension such that there is a light cone 1560 as shown in FIG. 10.

Each of the light cones 1550 and 1560 as well as the light rays emitted from the light foil can fulfill different functions. For example, the light cone 1550 could be used as a turn signal, whereas the light cone 1560 could be used as an approach light and the light rays emitted from the light foil could have decorative purposes.

Figure 11:
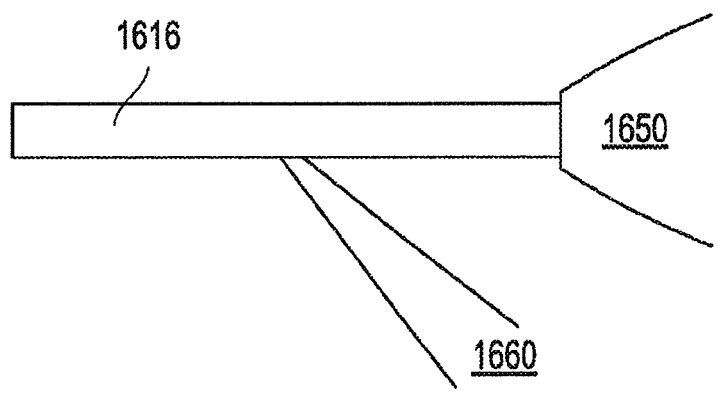
Figure 12:
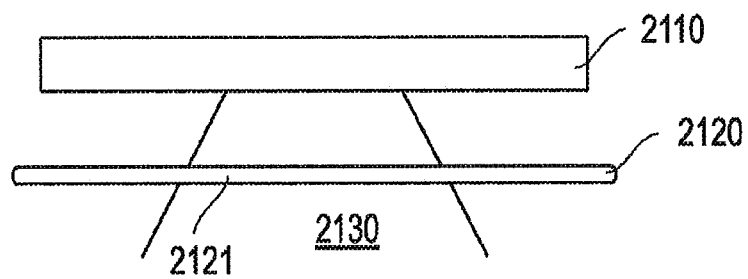

Further possibilities of light emissions from multifunctional lamp units of the invention are shown in FIGS. 10 to 12. Those examples are not terminal. There are many more possibilities which lie within the knowledge of a skilled person.

In the embodiment shown in FIG. 11, which is providing a slight alternative to the one of FIG. 10, a lamp unit 1616 is provided with two light sources each comprising a printed circuit board and LED as well as a light pipe such that light cone 1650 and 1660, respectively, can be decoupled into selected directions. Said directions depend on the functions to be fulfilled. In addition a light foil can be used emitting light ray homogeneously along the lens, although not shown.

FIG. 12 shows a lamp unit 2110 of the invention which is installed within a rear view device, e.g. an exterior mirror. A casing part 2120 of the rear view device is shown to overlap one side of the lamp unit 2110, which can be the underside. The casing part 2120 is provided with a transparent region 2121 through which a light cone 2130 can be emitted on the ground in order to provide a puddle light function. The light cone 2130 could come from a specially oriented third light source and/or light pipe.

Figure 13:
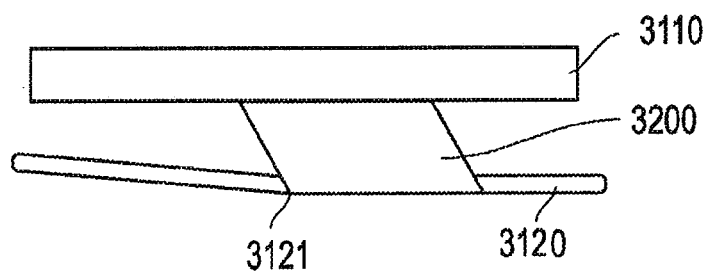

The embodiment of FIG. 13 shows a still further lamp unit 3110 arranged within a rear view device, e.g. a camera port, having a casing part 3120 with an opening 3121. A light pipe 3200 is extending from the lamp unit 3110 towards the opening 3121 within the casing part 3120 such that light can be guided into a specific direction to fulfill a specific function which could be the function of a logo lamp.

The rear view device can also be equipped with different illumination devices.

Different functions and devices can be incorporated into and/or controlled with the help of rear view devices. For example, useful are functions and devices to enhance, extend and/or sustain the functionality of the rear view device during normal or extreme conditions. This can comprise heating and/or cooling means, cleaning means such as wipers, liquid and/or gaseous sprays, actuator means for moving the rear view device or parts of it, such as for example a display, a camera system and/or parts of a camera system, comprising for example lenses, filters, light sources, adaptive optics like deformable mirrors, sensors and/or mirrors, and/or actuator means for inducing movement of other objects, for example parts of the vehicle and/or objects surrounding the vehicle. Furthermore it can comprise linear tracks and/or rotating wheels, like for example a filter wheel, for exchanging optical elements, comprising for example lenses, mirrors, light sources, sensors, adaptive optics like deformable mirrors and/or filters.

Prominent examples for functions and devices incorporated into and/or controlled with the help of rear view devices comprise illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rear view devices can comprise for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, comprising for example an ejection seat system, a direction indicator, a blind spot indicator, an approach system, a strong braking system, an emergency braking system, a charging status indicator, a vehicle mode system, comprising for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

An example for a rearview device including an illumination device fulfilling the brake light functions is described in German Patent Application No. 102012108488, filed on Sep. 11, 2012 for REARVIEW ASSEMBLY FOR MOTOR VEHICLE, which is hereby incorporated herein by reference in its entirety for all purposes. A light guidance unit for an illumination device used in a back vision system is described in German Patent Application No. 102012104529, filed on May 25, 2012 for LIGHT GUIDANCE UNIT, which is hereby incorporated herein by reference in its entirety for all purposes. An illumination device for a rearview device is described in German Patent Application No. 102012107833, filed on Aug. 24, 2012 for ILLUMINATION DEVICE AND REARVIEW DEVICE which is hereby incorporated herein by reference in its entirety for all purposes. A lighting device for a backvision unit is described in German Patent Application No. 102012107834, filed on Aug. 24, 2012 for LIGHTING DEVICE AND BACK-VISION UNIT, which is hereby incorporated herein by reference in its entirety for all purposes. A housing and display device of a rearview device is disclosed in European Patent No. 2738043, filed on Dec. 3, 2012 for HOUSING AND DISPLAY DEVICE, which is hereby incorporated herein by reference in its entirety for all purposes. An optical light pipe for a vehicle lighting unit is described in European Patent No. 2947378, filed on May 22, 2014 for OPTICAL LIGHT GUIDE FOR A VEHICLE LIGHTING UNIT, which is hereby incorporated herein by reference in its entirety for all purposes. A display device of a rearview device of a vehicle is disclosed in International Patent Application Publication No. WO 2015/173695, filed on May 7, 2015 for DISPLAY DEVICE, REAR VIEW DEVICE AND MOTOR VEHICLE and claiming priority to European Patent Application No. 2944866, filed on May 12, 2014 for OPTICAL UNIT, DISPLAY DEVICE, REAR VIEW DEVICE AND MOTOR VEHICLE INCLUDING THE SAME, each of which is hereby incorporated herein by reference in its entirety for all purposes. Further a light guiding device for an illumination device, in particular for a motor vehicle or a display device, in a rearview device of a motor vehicle is disclosed in European Patent Application No. 3045944, filed on Jan. 19, 2015 for LIGHT GUIDING DEVICE, which is hereby incorporated herein by reference in its entirety for all purposes. Still further a light guiding device for an illumination device, especially for a motor vehicle or an indicator device in a rearview device of a motor vehicle is disclosed in U.S. patent application Ser. No. 15/228,566, filed on Aug. 4, 2016, for LIGHT GUIDING DEVICE and is a continuation-in-part of U.S. patent application Ser. No. 15/000,733, filed on Jan. 19, 2016 for LIGHT GUIDING DEVICE, each of which is hereby incorporated herein by reference in its entirety for all purposes. In addition, an illumination device, particularly for a rear-view device of a motor vehicle and a method for producing the same are described in International Patent Application Publication No. WO 2016/147154, filed on Mar. 18, 2016 for ILLUMINATION DEVICE AND METHOD FOR PRODUCING AN ILLUMINATION DEVICE and claiming priority to German Patent Application No. 102015104163, filed on Mar. 19, 2015 for ILLUMINATION DEVICE AND METHOD FOR PRODUCING AN ILLUMINATION DEVICE, each of which is hereby incorporated herein by reference in its entirety for all purposes. An improved rear-view device for a motor vehicle which includes an electronic device is described in U.S. patent application Ser. No. 15/256,532, filed on Sep. 3, 2016 for ELECTRONIC DEVICE AND REAR-VIEW DEVICE and claiming priority to European patent application No. 3139711, filed on Sep. 3, 2015 for ELECTRONIC DEVICE AND REAR VIEW DEVICE, each of which is hereby incorporated herein by reference in its entirety for all purposes. A lighting device for a rearview device or a footwell device of a vehicle, including at least one luminous means is described in German Patent Application No. 102015115555, filed on Sep. 9, 2015 for ILLUMINATION DEVICE, REAR VIEW DEVICE, FOOTWELL DEVICE AND VEHICLE, which is hereby incorporated herein by reference for all purposes. A light module for a light assembly of an exterior rear view device is described in European Patent Application No. 3138734, filed on Sep. 3, 2015 for LIGHT MODULE, LIGHT ASSEMBLY AND REAR VIEW DEVICE FOR A VEHICLE, which is hereby incorporated herein by reference in its entirety for all purposes. A lighting device for a vehicle component, in particular for a rearview device of a motor vehicle, including a logo lamp and a deflection mirror are described in European Patent Application No. 3144183, filed on Sep. 13, 2016 for LIGHTING DEVICE, VEHICLE COMPONENT AND VEHICLE and claiming priority to German Utility Patent Application No. 202015104894, filed on Sep. 15, 2015 for LIGHTING DEVICE, VEHICLE COMPONENT AND VEHICLE, each of which is hereby incorporated herein by reference in its entirety for all purposes.

A camera module may include a plurality of different optical elements, such as but not limited to a variety of sensors, light sources, and housing parts.

The housing of a camera module may be made out of plastic, metal, glass, any other suitable material and/or any combinations thereof and may be used in combination with the techniques described below to change or modify the properties of the material or the material surface. Housings are, for example, described in German Patent Application No. 102016108247.3, filed on May 3, 2016 for CLEANING SYSTEM FOR A CAMERA and U.S. patent application Ser. No. 15/281,780, filed on Sep. 30, 2016 for TELESCOPING REAR VIEW ASSEMBLY WITH CAMERA AND LENS WIPING SYSTEM, each of which is hereby incorporated herein by reference in its entirety for all purposes.

The camera may include for example CCD or CMOS or light field sensors, as for example described in German Patent Application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, each of which is hereby incorporated herein by reference in its entirety for all purposes. Also an area of the sensor can be reserved for different purposes, for example to detect a test beam, as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference in its entirety for all purposes.

The optical elements may be molded or formed from any type of glass or any other suitable material. Glass is herein defined as a non-crystalline amorphous solid showing a glass transition when heated towards the liquid state. It includes, for example, the group of polymeric glasses, metallic glasses, silica glasses, but any other suitable material showing the glass transition may be used. The glass may be in a flat, wedge, rectangular, cylindrical, spherical, conical, elliptical, and/or circular shape, as described for example in German Patent Application No. 102016108247.3, and German Patent Application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, each of which is hereby incorporated herein by reference in its entirety for all purposes. The glass may also have a shape according to different needs or lens types. As non-limiting examples, camera modules may be equipped with lenses, like a wide-angle or fish-eye lens suitable to provide peripheral images, as described in U.S. patent application Ser. No. 15/281,780, and U.S. patent application Ser. No. 13/090,127, filed on Apr. 19, 2011 for REAR VIEW MIRROR SIMULATION, now U.S. Pat. No. 9,238,434, a Fresnel lens or micro lenses as described in German Patent Application No. 102011053999, filed on Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION, and a TIR (total internal reflection) lens as described in U.S. Pat. No. 8,740,427, filed on Sep. 8, 2010 for OPTIMAL LIGHT COUPLING FOR REAR VIEW DEVICES, each of which is hereby incorporated herein by reference in its entirety for all purposes. Another type of optical element know to be used in camera modules are optical fibers, such as fiber bundles and preferably fiber bundles having an optical head, as described for example in U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which is hereby incorporated by reference herein in its entirety for all purposes. Different methods can be used to produce such optical elements, for example as described in U.S. Pat. No. 8,460, 060, filed on Jan. 30, 2009 for METHOD FOR CREATING A COMPLEX SURFACE ON A SUBSTRATE OF GLASS, which is hereby incorporated herein by reference herein in its entirety for all purposes.

The optical elements can be transparent as described for example in U.S. Pat. No. 8,031,224, German Patent Application No. 102016108247.3, and U.S. patent application Ser. No. 13/242,829, filed on Sep. 23, 2011 and published as U.S. Patent Application Publication No. 2012/0154587 for CAMERA ARRANGEMENT AND DOOR HANDLE FOR MOTOR VEHICLE, each of which is hereby incorporated herein by reference in its entirety for all purposes. But the optical elements can also be semitransparent, as described in U.S. patent application Ser. No. 09/771,140 and U.S. patent application Ser. No. 13/090,127, each of which is hereby incorporated herein by reference in its entirety for all purposes. Still further, the optical elements can be completely or partially coated with different types of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 and published as U.S. Patent Application Publication No. 2017/0015802 for DECORATIVE COATINGS FOR PLASTIC SUBSTRATES, each of which is hereby incorporated herein by reference in its entirety for all purposes. Preferably the optical elements are made of a scratch-proof material as described for example in German Patent Application No. 102016108247.3, which is hereby incorporated herein by reference in its entirety for all purposes. The optical elements can have uncoupling structures at certain locations of the optical elements, and an optical film, for example an extrusion film, and a molded coating can be applied as described in German Patent Application No. 102011103200, which is hereby incorporated herein by reference in its entirety for all purposes. A coating to spectrally and stress control is described in U.S. patent application Ser. No. 15/124,310, which is hereby incorporated herein by reference in its entirety for all purposes. Different filters can be integrated into the optical elements such as for example gray filters or polarization filters, described in U.S. patent application Ser. No. 14/809,509, filed on Jul. 27, 2015 and published as U.S. Patent Application Publication No. 2016/0096487, for APPARATUS FOR LIGHT INTENSITY ADruSTMENT, which is hereby incorporated herein by reference in its entirety for all purposes.

Electrochromic substrates, polymer electrolytes and other charge conducting medias may be used for the optical elements based on the descriptions of European Patent Application No. 08103179.1, filed on Mar. 31, 2008 for PROCESS FOR PRODUCING ELECTROCHROMIC SUBSTRATES AND ELECTROCHROMIC ARTICLES MADE THEREFROM, European Patent No. 2202826, filed on Dec. 23, 2008 for POLYMER ELECTROLYTES AND DEVICES CONTAINING, U.S. Pat. No. 7,999,992, filed on Jan. 7, 2005 for CHARGE CONDUCTING MEDIUM and U.S. Pat. No. 8,537,451, filed on Mar. 26, 2008 for PROCESSES FOR PRODUCING ELECTROCHROMIC SUBSTRATES AND ELECTROCHROMIC ARTICLES MADE THEREFROM, each of which is hereby incorporated herein by reference in its entirety for all purposes.

The camera module can also be equipped with apparatuses for light intensity adjustment as described for example in U.S. patent application Ser. No. 14/809,509 and light level intensifier tubes as described in U.S. patent application Ser. No. 09/771,140, each of which is hereby incorporated herein by reference in its entirety for all purposes. The electrochromic substrates and devices used in European Patent Application No. 08103179.1, European Patent No. 2202826, U.S. Pat. Nos. 7,999,992, and 8,537,451, each of which is hereby incorporated herein by reference in its entirety for all purposes, can also be used for this purpose as well as a transflector to transmit or reflect light based on a corresponding input signal, as described in German Patent Application No. 102016106126.3, filed on Apr. 4, 2016 for IMAGING SYSTEM, which is hereby incorporated herein by reference in its entirety for all purposes.

The camera module or a cover adapted to the camera module can be moved using different actuators, drives and/or a flexible track, as for example described in German Patent Application No. 102016108247.3 and U.S. patent application Ser. No. 15/281,780, filed on Sep. 30, 2016 for TELESCOPING REARVIEW ASSEMBLY WITH CAMERA AND LENS WIPING SYSTEM, each of which is hereby incorporated herein by reference in its entirety for all purposes.

Still further, the camera module can also include cleaning elements to clean the optical element facing outwards and being exposed to the environment. The cleaning element can for example include wipers, brushes, lips, nozzles, fans and similar elements as are described in European Patent Application No. 14165197.6, filed on Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, filed on Sep. 30, 2016 for TELESCOPING REARVIEW ASSEMBLY WITH CAMERA AND LENS WIPING SYSTEM, German Patent Application No. 102016108247.3, European Patent Application No. 13163677.1, filed on Apr. 15, 2013 for LENS WIPER, European Patent Application No. 15173201.3, filed on Jun. 22, 2015 for LENS CLEANING WITH FLEXIBLE ACTUATOR and European Patent No. 1673260, filed on Oct. 14, 2003 for CLEANING DEVICE, each of which is hereby incorporated herein by reference in its entirety for all purposes. The cleaning devices are not limited in composition, and may for example include any fabric, elastomeric, sponge, brush, or combination of these. Special wiper elements including wiper arms, wiper blades, wiping cloth, wiping tissue and combinations thereof are described in European Patent Application No. 14165197. 6, which is hereby incorporated herein by reference in its entirety for all purposes. A wiper element may for example be controlled according to the method described in European Patent Application No. 130164250.6, filed on Apr. 18, 2013 for METHOD FOR CONTROLLING A WIPER DEVICE, which is hereby incorporated herein by reference in its entirety for all purposes. A reservoir for holding a cleaning liquid as described in European Patent Application No. 14165197.6, which is hereby incorporated herein by reference in its entirety for all purposes. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European Patent No. 1328141, filed on January 12, for ASSEMBLY HA YING A CONDUCTOR FROM FLEXIBLE MATERIAL AND METHOD FOR MANUFACTURING SUCH AN ASSEMBLY, and U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, each of which is hereby incorporated herein by reference in its entirety for all purposes.

Also, light sources can be installed or integrated into the camera module to increase the visibility of surrounding objects, measure distances and directions and detect dirt, such as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, U.S. Patent Application No. 62/470,658, filed on Mar. 13, 2017, 2016 for LIGHT EMITTING MIRROR BEZEL and U.S. patent application Ser. No. 09/771,140, filed on Jan. 26, 2001 for MONITORING DEVICE FOR VEHICLES, IN PARTICULAR, MOTOR VEHICLES, each of which is hereby incorporated herein by reference in its entirety for all purposes.

Different heating means, like heating coils, heating devices integrated into the lens holder or the bezel, or other heating elements can be used to impede condensation and icing at the surface of optical elements, as for example described in German Patent Application No. 102016108247.3, U.S. Patent Application No. 62/470,658, and German Patent Application No. 102016107545.0, filed on Apr. 22, 2016 for HEATING DEVICE FOR A CAMERA LENS, each of which is hereby incorporated herein by reference in its entirety for all purposes.

A watertight seal against weather effects, as well as against the influence of washing processes with detergents, solvents and high pressure cleaners can be used on the housing of the camera module as described in U.S. patent application Ser. No. 13/090,127, which is hereby incorporated herein by reference in its entirety for all purposes.

In another example, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German Patent Application No. 102016107545.0, which is hereby incorporated herein by reference in its entirety for all purposes.

A conductor track can be embedded within plastic parts of the camera module as described in European Patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, each of which is hereby incorporated herein by reference in its entirety for all purposes.

The camera module may include a power harvesting system as described for example in European Patent Application No. 09171683.7, filed on Sep. 29, 2009 for SELF SUSTAINING REAR VIEW MIRROR, which is hereby incorporated herein by reference in its entirety for all purposes.

A fault detection system for electric consumers as described in U.S. Pat. No. 8,487,633, filed on Jan. 14, 2010 for FAULT DETECTION OF ELECTRIC CONSUMERS IN MOTOR VEHICLES, which is hereby incorporated herein by reference in its entirety for all purposes, can be used to detect failure of the camera module.

Different types of fixings can be used to fix the camera module to the vehicle or other components, such as for example the snap-fit connection described in European Patent No. 2233360, filed on Mar. 27, 2009 for SNAP FIT CONNECTION IN A REAR VIEW MIRROR, which is hereby incorporated herein by reference in its entirety for all purposes.

Different control means and analyzing devices can be used, such as the computation units described in U.S. patent application Ser. No. 13/090,127, German Patent Application No. 102016106126.3, German Patent Application No. 102011053999, European Patent No. 2146325, filed on July 16, for RECORDING DEVICE FOR RECEIVING, PROCESSING AND STORING IMAGE FILES IN A VEHICLE AND METHOD, and U.S. Pat. No. 8,849,104, filed on Jul. 16, 2008 for RECORDING DEVICE AND METHOD FOR CAPTURING AND PROCESSING IMAGE DATA IN A VEHICLE, each of which is hereby incorporated herein by reference in its entirety for all purposes. In addition, HDR (high dynamical range) technology can be used according to U.S. patent application Ser. No. 14/830,406, filed on Aug. 19, 2015 for REAR VIEW DEVICE FOR A MOTOR and published as US 2015/0358590, which is hereby incorporated herein by reference in its entirety for all purposes.

There are many more variations of in particular the amount of light sources, the type of light sources and the relative arrangement of the light sources within a multifunctional lamp unit of the invention.

The invention is restricted neither to special rear view devices nor to special arrangements of a lamp unit with such a device.

REFERENCE SIGNS 1110 lamp unit
1111 housing
1112 printed circuit board
1113 LED
1114 light pipe
1115 light foil
1116 light window
1117 control unit
1120 casing part
1210 lamp unit
1211 housing
1212 printed circuit board
1213 LED
1214 light pipe
1222 printed circuit board
1223 LED
1224 light pipe
1235 light foil
1236 light window
1247 control unit
1250 casing part
1336 lens
1340 coating
1440 light ray
1446 lamp unit
1450 light cone
1516 lamp unit
1550 light cone
1560 light cone
1616 light unit
1650 light cone
1660 light cone
2110 lamp unit
2120 casing part
2121 transparent region
2130 light cone
3110 lamp unit
3120 casing part
3121 opening
3200 light pipe
11111 recess
11112 recess

What is claimed is:

1. A multifunction lamp unit for a vehicle comprising:
a housing;
at least one light pipe together with at least one light source disposed at least partially within the housing; and
a clear lens substantially enclosing the housing, the at least one light pipe and the at least one light source, the lens having an inner surface, an outer surface disposed opposite the inner surface and at least one of a continuous transparent and translucent coating on the outer surface,
wherein the at least one light sources is configured to emit light based on received electrical power from an electrical power source,
wherein the at least one light source is arranged adjacent to and directed towards the at least one light pipe,
wherein in response to the at least one light source emitting light, the at least one of the continuous transparent and translucent coating is at least partially permeable to at least some light which is emitted by the at least one light source and passed through the lens, and
wherein the at least one light pipe is provided with at least one of an inside coating and an outside coating,
wherein the coating is located at least one of on selective locations of the light pipe and in different thicknesses of the light pipe.

2. The multifunctional lamp unit of claim 1, wherein at least one of the coating of the clear lens and the coating of the at least one light pipe is a hardcoating selected from a group consisting of an organo-silicon, an acrylic, a urethane, melamine and a $SiO_xC_yH_z$.

3. The multifunctional lamp unit of claim 1, wherein at least one of the coating of the clear lens and the coating of the at least one light pipe has a different refractive index compared to a refractive index of a material of the light pipe.

4. The multifunctional lamp unit of claim 1, further comprising two or more light sources.

5. The multifunctional lamp unit of claim 4, further comprising two or more light pipes in close vicinity to the two or more light sources attached to the central light engine.

6. The multifunctional lamp unit of claim 5, wherein one or more of the two or more light pipes are coated at selective locations.

7. The multifunction lamp unit of claim 1, wherein the unit is produced out of plastic in a 3-component injection procedure, wherein the refractive index of the plastic of the clear lens is selected to be different from the refractive index of the plastic of the light pipe, the boundary between the clear lens and the at least one light pipe adjacent to it is at least partly formed with a structure.

8. The multifunctional lamp unit of claim 1, further comprising at least one light foil.

9. The multifunction lamp unit of claim 8, wherein the light foil is arranged at least partly between the clear lens and at least a part of the at least one light pipe.

10. The multifunction lamp unit according to claim 1, wherein the housing is formed with a first recess to build an installation space for at least one light source, wherein the first recess is sealed.

11. The multifunction lamp unit according to claim 10, wherein the housing is formed with a second recess to build an installation space for a control unit, wherein the second recess is sealed.

12. The multifunction lamp unit according to claim 11, wherein the control unit is connected to at least one of the at least one light source, a light foil and the vehicle.

13. The multifunction lamp unit according to claim 8, wherein the light foil is extending along at least a part of the clear lens.

14. The multifunction lamp unit according to claim 8, wherein at least one light coupling area is provided at at least one of a first end of a first light pipe facing the installation space and a first end of a second light pipe extending along a region of the light foil.

15. The multifunction lamp unit according to claim 1, wherein each light pipe of the at least one light pipe is enclosed by the housing and the clear lens.

16. The multifunction lamp unit according to claim 1, wherein the light rays from a first light source are subjected to a total reflection at the boundary between the first light pipe and the clear lens outside at least one light decoupling area.

17. The multifunction lamp unit according to claim 1, wherein the light rays from a second light source are decoupled along at least a part of the extent of the second light pipe.

18. The multifunction lamp unit according to claim 17, wherein the light rays decoupled from the second light pipe pass at least one of a light foil, the clear lens and the housing.

19. The multifunction lamp unit according to claim 17, wherein the light rays decoupled from the second light pipe pass an opening in at least one of the light foil and the housing.

20. The multifunction lamp unit according to claim 1, wherein the light rays from a third light source are coupled at a first end of a third light pipe and decoupled at a second end of the third light pipe.

21. The multifunction lamp unit according to claim 1, wherein there is a plurality of light decoupling regions provided by at least one of the clear lens and the housing.

22. The multifunction lamp unit according to claim 1, wherein there is a plurality of at least one of light decoupling directions and light decoupling ranges.

23. The multifunction lamp unit according to claim 1, wherein there is a plurality of light decoupling regions, and light having different characteristics are decoupled from the different decoupling regions.

24. The multifunction lamp unit according to claim 1, wherein the clear lens is made out of a polymeric substrate, wherein the polymeric substrate is coated with a chromium-based reflective coating and wherein the polymeric substrate and the chromium-based reflective coating are at least in part permeable to light originating from at least one of the light foil and the at least one light source.

25. The multifunction lamp unit according to claim 24, wherein the coating is an alloy of chromium and a dopant material, the dopant material being selected from hexagonally close-packed transition metals, the alloy having a crystal structure of a primary body-centered cubic phase in coexistence with a secondary omega hexagonally close-packed phase.

26. The multifunction lamp unit according to claim 25, wherein the alloy is a binary alloy of chromium and the dopant material.

27. The multifunction lamp unit according to claim 24, wherein the atomic percentage of a dopant material in the binary alloy is in the range of from about 1.9 at. % to about 5.8 at. %.

28. The multifunction lamp unit according to claim 24, wherein a dopant material is selected from hexagonally close-packed transition metals zirconium, titanium, cobalt, hafnium, rubidium, yttrium and osmium.

29. The multifunction lamp unit according to claim 24, wherein the dopant material is selected from hexagonally close-packed transition metals zirconium, titanium and cobalt.

30. The multifunction lamp unit according to claim 25, wherein the alloy is a binary alloy and the dopant material is zirconium, and wherein the atomic percentage of the zirconium in the binary alloy is in the range of from about 4.5 at. % to about 5.8 at. %.

31. The multifunction lamp unit according to claim 25, wherein the alloy is a binary alloy and the dopant material is titanium, and wherein the atomic percentage of the titanium in the binary alloy is in the range of from about 1.9 at. % to about 5.8 at. %.

32. The multifunction lamp unit according to claim 25, wherein the alloy is a binary alloy and the dopant material is cobalt, and wherein the atomic percentage of the cobalt in the binary alloy is in the range of from about 1.9 at. % to 5.7 at. %.

33. The multifunction lamp unit according to claim 24, wherein the coating has a thickness of 200 nm, or 100 nm or in the range of from 40 nm to 80 nm, or in the range of from 50 nm to 70 nm, or about 60 nm.

34. The multifunction lamp unit according to claim 24, wherein the polymeric substrate is formed from a material selected from a group consisting of polyacrylate, polyester, polystyrene, polyethylene, polypropylene, polyamides, polyamides, polycarbonate, epoxy, phenolic, acrylonitrile-butadiene-styrene, acrylonitrile-styrene-acrylates, acetal and blends of these.

35. The multifunction lamp unit according to claim 24, wherein the polymeric substrate is formed from a material selected from a group consisting of polycarbonate, poly(2,2'-dihydroxyphenylpropane) carbonate, polydiethyleneglycol bis(allyl carbonate), polymethylmethacrylate and polystyrene, or blends thereof.

36. The multifunction lamp unit according to claim 24, wherein the polymeric substrate comprises a pre-coated film in the form of either a hardcoat, an inorganic oxide, or a thin metal film, or a combination of such pre-coated films.

37. The multifunctional lamp unit of claim 1, wherein two or more light pipes are present at a same location wherein at least one light pipe can be seen from the outside and wherein one or more of the other light pipes is coated with a chromium-based reflective coating.

38. The multifunctional lamp unit of claim 37, wherein the chromium-based reflective coating is behind where the two or more light pipes meet.

39. A rear view device of a vehicle, comprising the multifunctional lamp unit of claim 1.

40. The rear view device of claim 39, wherein the at least one light source and a light foil fulfill different light functions.

41. The rear view device of claim 40, wherein there are at least two light sources fulfilling different light functions.

42. The rear view device of claim 39, further comprising a head moveable relative to the vehicle, with the head comprising at least one casing part providing at least one opening for the multifunction lamp unit.

43. The rear view device of claim 42, wherein the clear lens extends along the casing part.

44. The rear view device of claim 42, wherein the clear lens is connected at least to the casing part.

45. The rear view device of claim 42, wherein the casing part is provided by a bezel.

46. The rear view device of claim 39, further comprising at least one of a camera and a reflective element.

47. The rear view device of claim 46, wherein the camera is arranged within the head.

48. The rear view device of claim 39, further comprising at least one light decoupling region providing at least one of a turn light indicator, a blind spot indicator, a puddle light, a logo light and an approach light.

49. A multifunction lamp unit for a vehicle comprising:
a housing;
at least one light pipe together with at least one light source disposed at least partially within the housing; and
a clear lens substantially enclosing the housing, the at least one light pipe and the at least one light source, the lens having an inner surface, an outer surface disposed opposite the inner surface and at least one of a continuous transparent and translucent coating on the outer surface,
wherein the at least one light sources is configured to emit light based on received electrical power from an electrical power source,
wherein the at least one light source is arranged adjacent to and directed towards the at least one light pipe,
wherein in response to the at least one light source emitting light, the at least one of the continuous transparent and translucent coating is at least partially permeable to at least some light which is emitted by the at least one light source and passed through the lens, and
wherein the at least one light pipe is provided with optical modifiers,
wherein the optical modifiers are introduced into the at least one light pipe by choosing at least one additive for a respective plastic.

50. The multifunctional lamp unit of claim 49, wherein the optical modifiers are selected from a group consisting of etches, tints, dyings, additives, reflecting materials, scattering materials or optics molded into the light pipe.

* * * * *